May 22, 1923.

H. M. MATTHEWS

LEAK DETECTOR FOR TIRE TUBES

Filed Aug. 23, 1922

1,455,962

Inventor.
Herbert M. Matthews
By Chapin & Neilson
Attorney

Patented May 22, 1923.

1,455,962

UNITED STATES PATENT OFFICE.

HERBERT M. MATTHEWS, OF WORTON, MARYLAND.

LEAK DETECTOR FOR TIRE TUBES.

Application filed August 23, 1922. Serial No. 583,869.

*To all whom it may concern:*

Be it known that I, HERBERT M. MATTHEWS, a citizen of the United States, residing at Worton, in the county of Kent and State of Maryland, have invented certain new and useful Improvements in Leak Detectors for Tire Tubes, of which the following is a specification.

This invention relates to improvements in leak detectors for tire tubes, and has for its object to provide a cheap, simple and efficient device for quickly locating a leak in the inner tube of an automobile tire.

The invention consists of the novel construction and arrangement hereinafter more fully set forth in the following specification and pointed out in detail in the appended claim.

In the accompanying drawing,—

Figure 1:
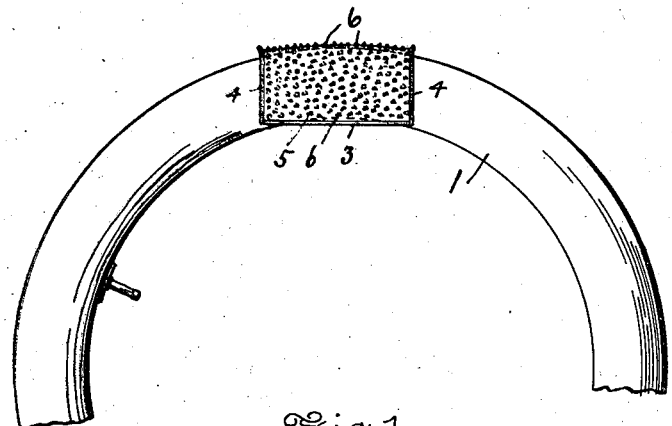
Figure 1 is a side elevation of an inner tube showing my invention applied thereto.
Figures 2, 3:
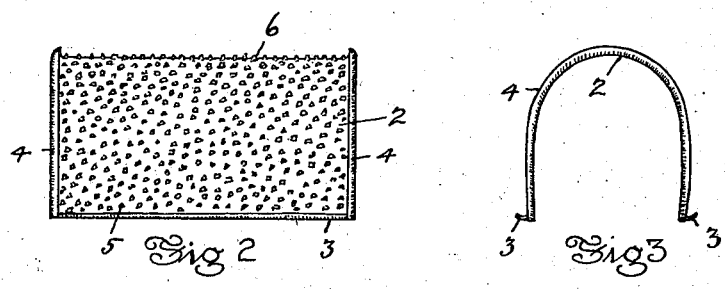
Figure 2 is a detail enlarged side elevation of my improved detector.
Figure 3 is an end view of Figure 2.
Figure 4:
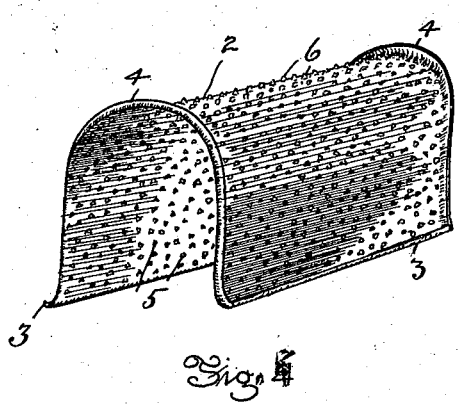
Figure 4 is a detail perspective view of the detector.

Referring to the accompanying drawing, in which like reference numerals designate like parts throughout the several views thereof, 1 designates an inner tube, and 2 my improved leak detector. The said detector 2 is formed of thin resilient metal having the lower ends 3 slightly turned so that the detector can be easily slipped over the tube 1. The ends 4 are also slightly turned upwardly so as to provide a smooth edge to the tube when the detector 2 is moved along the said tube, in either direction, to locate the leak. The said detector is preferably made of spring metal so that the lower ends can be forced in against the tube when being used. The detector 2 is provided with a number of apertures 5 therein preferably punched from the inside so as to form a burr 6 on the outer surface of the detector, which permits the said detector to be used to scrape the surface of the tube when it is desired to apply a patch thereto, thus dispensing with the use of emery or sand paper for this purpose.

When it is desired to locate a leak in the tube 1, the detector 2 is placed over the said tube, as shown in Figure 1, and then moved around the tube in either direction and as soon as the detector comes over the leak in the tube the air escaping therefrom will make a peculiar noise as the apertures 5 in the detector passes over the leak, thereby enabling the person using the device to locate the leak in the tube.

Having thus described my invention, what I claim is:

A leak detector for tire tubes, comprising a thin piece of resilient metal having the sides thereof bent and the edges turned, and provided with a number of apertures therein forming a number of burrs on the outer surface.

In testimony whereof I affix my signature.

HERBERT M. MATTHEWS.